United States Patent
Marsland

[15] 3,680,436
[45] Aug. 1, 1972

[54] TOOL CHANGER CLAMP
[72] Inventor: George H. Marsland, Bristol, Conn.
[73] Assignee: Pratt & Whitney Inc., West Hartford, Conn.
[22] Filed: Oct. 12, 1970
[21] Appl. No.: 80,035

[52] U.S. Cl.................................90/11 A, 279/1 B
[51] Int. Cl.................................B23c 1/00
[58] Field of Search..............90/11 A; 279/1 B, 1 TS

[56] References Cited

UNITED STATES PATENTS

| | | | |
|---|---|---|---|
| 2,465,837 | 3/1949 | Benjamin et al | 279/1 B |
| 3,304,837 | 2/1967 | Perman | 90/11 A |

*Primary Examiner*—Gerald A. Dost
*Attorney*—Radford W. Luther

[57] ABSTRACT

A Tool Changer Clamp has a rotatable tool spindle having an axially extending socket within its tool mounting end to receive a tool holder. The outer surface of the spindle is threaded to receive a collar which is adapted to retain the tool holder within the spindle. A serrated locking plate is secured to the outer surface of the spindle in such a manner that it may axially slide over the outer surface. Springs urge the locking plate into engagement with mating serrations on the collar to prevent rotation of the collar with respect to the spindle when the clamp is subjected to vibrations. A piston is adapted to disengage the locking plate from the collar to permit manual or automatic tool changing.

11 Claims, 9 Drawing Figures

INVENTOR
GEORGE H. MARSLAND
BY Radford W Luther
ATTORNEY

INVENTOR
GEORGE H. MARSLAND
BY Radford W Luther
ATTORNEY

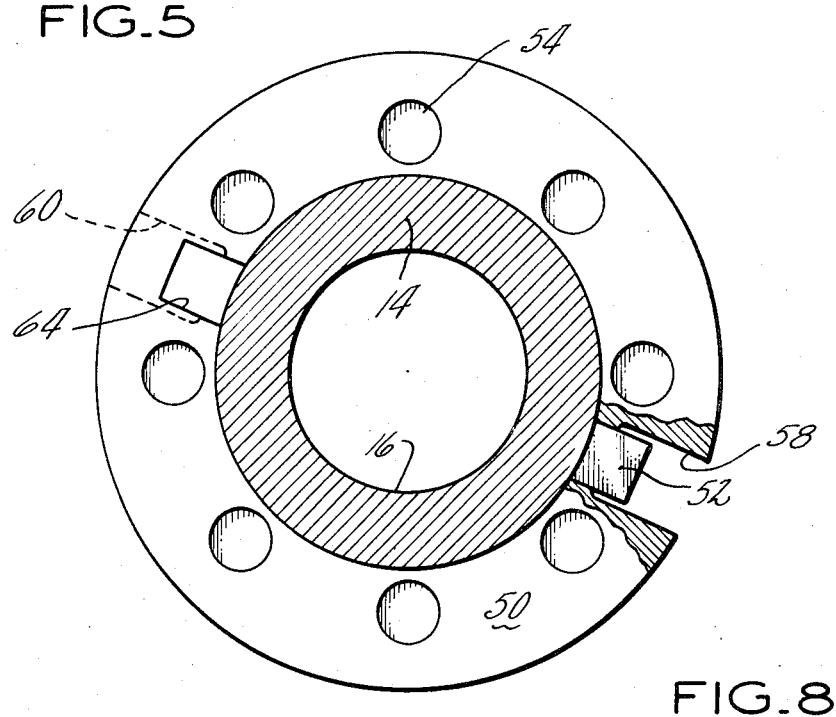
FIG. 5
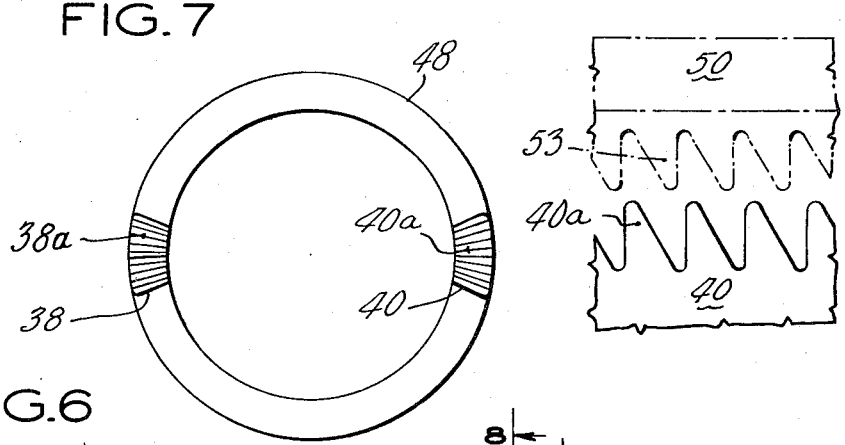
FIG. 7
FIG. 8
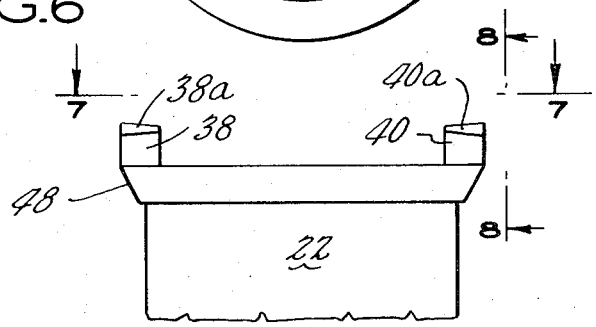
FIG. 6
INVENTOR
GEORGE H. MARSLAND
BY Radford W Luther
ATTORNEY

TOOL CHANGER CLAMP

BACKGROUND OF THE INVENTION

This invention relates to machine tools, and particularly to mounting means for rotating tool holders of machine tools. The invention further relates to clamping arrangements for tool holders.

Machine tools are frequently subjected to heavy vibrations produced by machining operations such as milling and drilling. These vibrations have a tendency to loosen the collar or cap to such an extent that the engagement between the tool holder and spindle is affected. Moreover, if these vibrations are severe enough to cause the collar to rotate through a sufficient angular displacement, the tool holder is liable to drop out of the tool changer clamp. The prevailing method of securing the collar to the spindle is to establish a tight threaded engagement between the collar and the spindle to prevent movement of the collar with respect to the spindle. However, this method is not always efficacious since severe vibrations can still rotate the collar with respect to the spindle.

SUMMARY OF THE INVENTION

The invention provides a means whereby a tool holder may remain positively locked within a spindle when the machine tool is subjected to severe vibrations during machining operations. A prominent attribute of a tool holder clamp, according to instant invention, is that the tool holder may be quickly engaged with or disengaged from the spindle, and locked, when engaged, in such a manner that it is accurately positioned in the spindle.

To attain this end, a specific embodiment of the invention has a serrated locking plate axially slidable over the spindle which is adapted to engage mating serrations on the collar, to thereby lock the collar upon the spindle in such a manner that even severe vibrations cannot deteriorate the locking engagement therebetween. An air driven piston is adapted to contact the locking plate to urge the locking plate away from, and therefore out of locking engagement with, the collar.

Another feature of the invention is that the piston is constructed and arranged such that the tool changing process may be effected manually or automatically, as illustrated in the specific embodiment. This manner of operation is achieved by actuating a selector means which determines the position of the piston when air pressure is applied thereto. A brake surface, mounted upon the piston, is adapted to contact the collar when the automatic mode of operation is selected, so that the spindle may rotate relative to the collar to enable the tool holder to be changed. In manual operation, the selector means prevents the piston from moving to such an extent that the brake surface thereupon engages the collar, and thus, the tool holder may be removed by conventional means in a manual manner.

As a further feature, the serrations upon the locking plate and the collar are so constructed that the angular orientation between the locking plate and the collar does not significantly affect the locking engagement between the collar and the locking plate.

It is a primary object of the invention to provide a tool changer clamp wherein the collar, which locks the tool holder within the spindle, is provided with a positive locking means to resist loosening due to vibrations caused in machining operations.

It is another object to provide a locking device for a tool changer clamp to lock the tool holder in the spindle in such a manner that the tool holder may be manually or automatically changed.

A further object is to provide a locking device for a tool holder retaining collar wherein the orientation of the device with respect to the collar does not affect the locking engagement therebetween.

A still further object is to provide a tool changer clamp incorporating a collar to lock the tool holder within the spindle, and a serrated locking plate to engage the collar for positively locking the collar against rotation relative to the spindle.

Various other objects, features, and advantages of the present invention will become apparent from the following detailed description taken in conjunction with the accompanying drawings.

BRIEF DESCRIPTION OF THE DRAWINGS

FIG. 5 is a rear elevational view of the locking plate, as it would appear looking along the line 5—5 of FIG. 3.

FIG. 6 is a fragmentary side view of the locking collar, per se.

FIG. 7 is a top view of the locking collar, taken along the line 7—7 of FIG. 6.

FIG. 8 is a view of the serrations on a projection of the locking collar, taken along the line 8—8 of FIG. 6, illustrating the relationship between the serrations of the locking collar and those on the locking plate.

DETAILED DESCRIPTION OF PREFERRED EMBODIMENT

Figure 1:
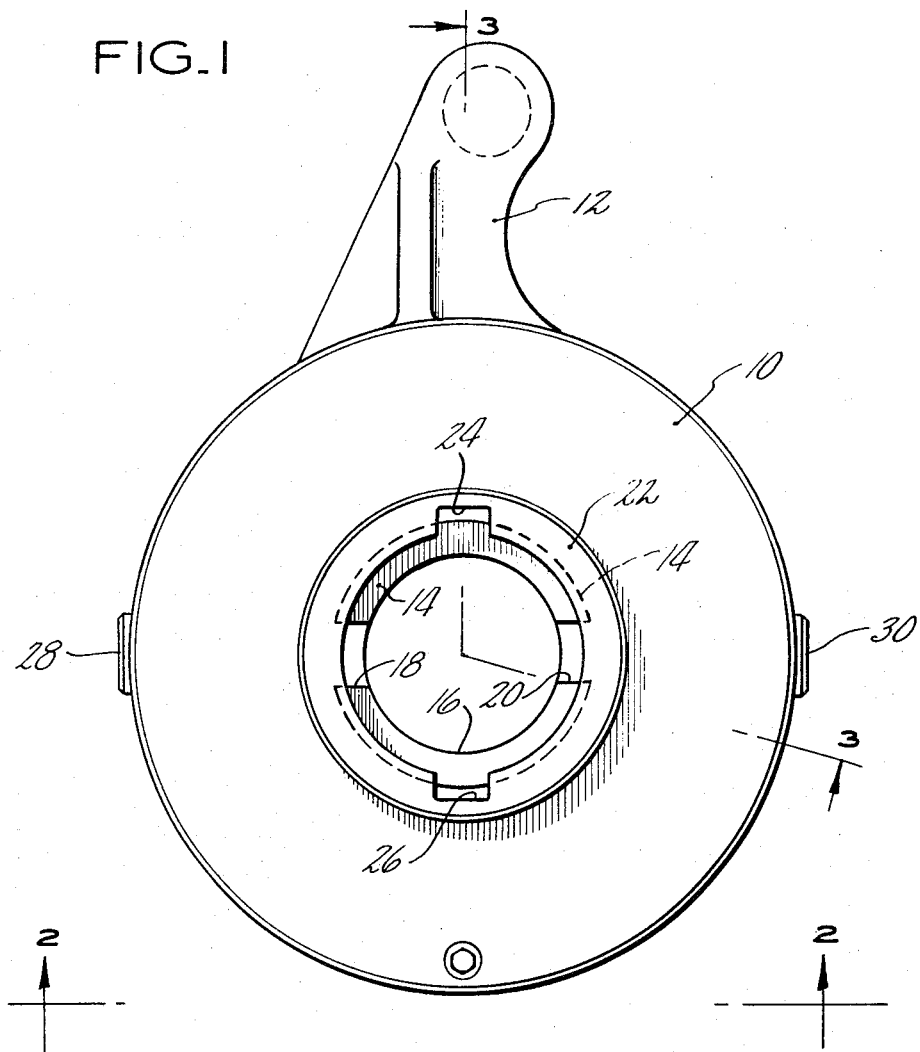
FIG. 1 is a front elevational view of a tool changer clamp according to the invention.
Figure 3:
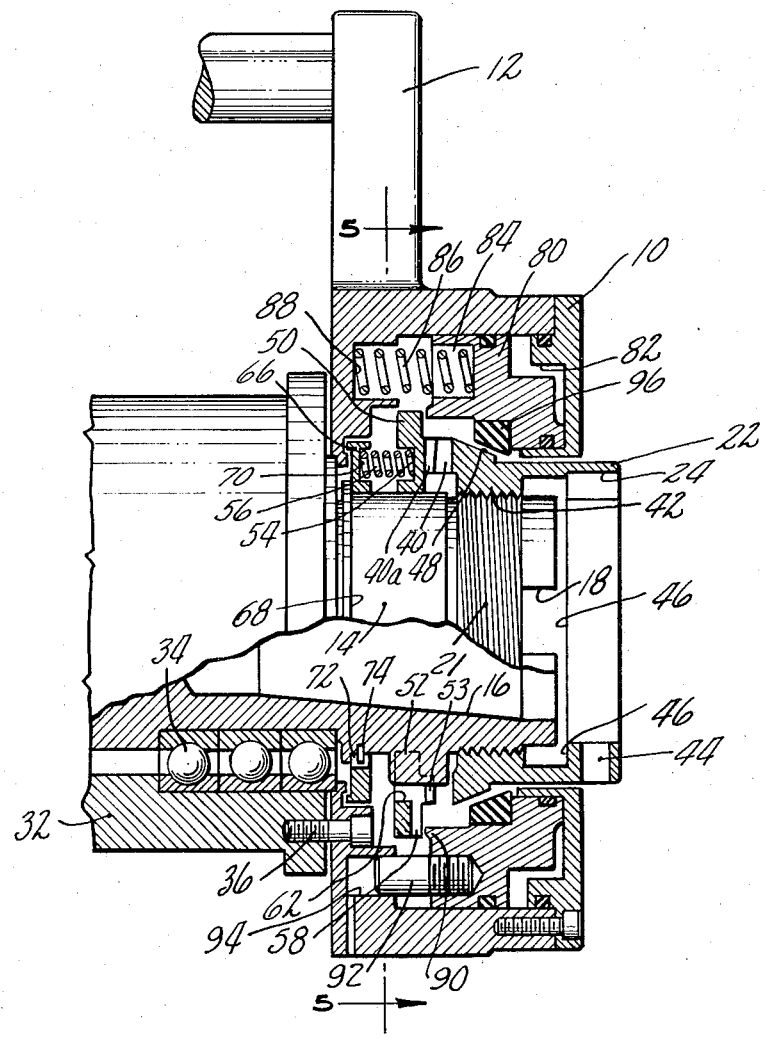
FIG. 3 is a fragmentary sectional view of the tool changer clamp of FIG. 1, taken along the line 3—3.

There is shown in FIG. 1 a tool changer clamp, according to the invention, which includes a housing 10 and an integral mounting bracket 12 for securing the tool changer clamp to a machine tool. A spindle 14 is mounted within the housing 10 for rotational movement therein and is provided with the usual socket 16, as best seen in FIGS. 1 and 3, for snugly receiving a tool holder or tool. The front portion of the spindle is provided with generally square-shaped notches 18 and 20, which form driving slots for engaging the mating lugs on a tool holder.

As shown in FIG. 3, the spindle has a peripheral threaded portion 21 for threadably engaging a clamping nut or locking collar 22. The locking collar 22 is also provided with a pair of diametrically opposed square-shaped notches, designated 24 and 26, which are adapted to be aligned with the respective notches 18 and 20 to permit insertion of a tool holder into the socket 16 of the spindle 14 and withdrawal therefrom. As shown in FIG. 1, the respective notches of the locking collar are spaced from those of the spindle and in this position, a tool holder would be retained in permanent engagement with the socket of the spindle. The tool changer clamp of FIG. 1 is also provided with two tool loading mode of operation selection buttons 28 and 30 for selecting either automatic tool changing or manual tool changing, as will be more fully explained hereinafter.

Figure 9:
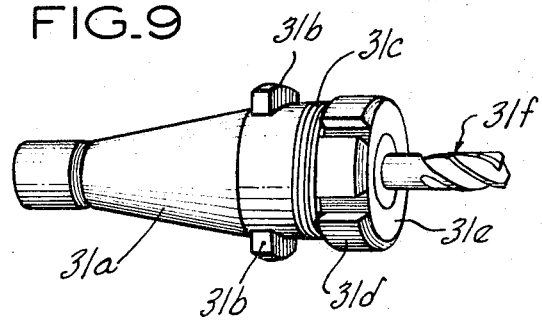
FIG. 9 is a perspective view of a typical prior art tool holder adapted to be utilized in conjunction with the tool changer clamp of FIG. 1.

Before describing in detail the tool changer clamp of the invention, it would be profitable to study the construction of the typical prior art tool holder of FIG. 9 which is suitable for use with the specific clamp arrangement shown in FIG. 1. The tool holder or tool of FIG. 9 comprises a tapered shank 31a adapted to be received in the socket 16 of the spindle 14 for rotational movement therewith. Projecting radially outwardly from the shank 31a, at the large end thereof, are lugs 31b, the lugs being in diametrical alignment. An externally threaded forward portion 31c has a thrust sleeve 31d threaded thereon to engage the thrust ring 31e, which in turn retains a split collet (not shown) within shank 31a. The collet is adapted to securely grip the left end of a tool 31f.

As shown in FIG. 3, the spindle 14 is mounted for rotation in a quill 32 by means of a suitable bearing 34. The housing 10 of the tool changer clamp is bolted onto the quill 32 by a plurality of bolts 36. It will be appreciated that the spindle 14 is rotated by suitable motor in the machine tool with which the tool changer clamp is associated.

The locking collar 22 is of generally conventional construction, except for the provision of two diametrically opposed projections 38 and 40 which extend in the direction of the axis of the collar and have a plurality of serrations or teeth 38a and 40a fashioned thereupon, as can be best seen in FIGS. 6–8. Turning back to FIG. 3, it can be seen that the collar 22 has interior threads 42 formed on its inner periphery for engaging the mating threads on the portion 21 of the spindle 14. The usual wrench-receiving holes 44 are also provided in the collar adjacent its front extremity to permit the collar 22 to be rotated with respect to the spindle for manual tool changing. Adjacent the front end of the collar 22, a shoulder 46 is defined for contacting the lugs 31b of the tool holder and thereby retaining the tool holder in the socket 16 of the spindle. The left, or rear, peripheral outer wall of the collar 22 is fashioned to form a bevelled surface 48 so that the collar may be restrained against rotational movement by means and for purposes described hereinafter.

Referring now to FIGS. 3 and 5, a locking plate device 50 is shown mounted on the outer periphery of the spindle 14 in coaxial relationship therewith. The locking plate 50 is adapted to slide axially over the spindle 14 and is restrained from rotational movement with respect to the spindle by a projection 52 on the spindle 14. It will be understood that the projection 52 is actually a separate structure secured to the spindle by suitable means, such as a screw. The locking plate 50 includes a plurality of circumferentially arranged serrations 53 for engaging the serrations 38a and 40a of the locking collar 22 to prevent rotation of the collar 22 with respect to the spindle 14 when the structure is subjected to severe vibrations. The left, or rear, side of the locking plate 50 includes a plurality of circumferentially spaced recesses 54, in which a plurality of springs 56 are respectively contained for urging the locking plate 50 into engaging contact with the serrations 38a and 40a of the locking collar 22. The locking plate 50 also includes two diametrically opposed slots 58 and 60 which respectively communicate with slots 62 and 64, formed in the rear portion of the locking plate 50. The reason for providing two identical diametrically opposed slot arrangements is to dynamically balance the spindle, it being understood that the spindle itself is provided with suitable holes (not shown) to offset the imbalance engendered by the projection 52. It will be noted that the projection 52 not only prevents rotation of the locking plate 50 with respect to the spindle 14, but also serves as a guide for the axial sliding movement of the locking plate 50 upon the outer periphery of the spindle.

A ring 66 (FIG. 3) abuts a shoulder 68 formed on the outer periphery of the spindle and embodies a plurality of recesses 70 which function as spring seats for the respective springs 56. The interior periphery of the ring 66 has a recess 72 which straddles a pin 74, integral with the spindle 14, to prevent rotation of the ring 66 with respect to the spindle. Hence, the ring 66 is effectively fixedly secured to the spindle 14, since the springs 56 urge the ring against the abutment 68, thereby preventing axial movement of the ring 66 along the outer periphery of the spindle, and since the pin 74 prevents rotation of the ring 66 relative to the spindle 14. It should also be noted that a clearance space is provided between ring 66 and the housing 10 so that no friction is encountered therebetween as the spindle 14 rotates with the ring.

A piston 80, coaxially mounted with respect to the locking collar 22 and the spindle 14, is adapted to be slidingly displaced to the left, or rear, portion of the housing 10 by means of an air pressure signal directed into the chamber 82 by suitable means (not shown). The piston is illustrated in its first position. A plurality of recesses 84 are provided adjacent the left, or rear, end thereof for receiving a plurality of springs 86 to urge the piston away from the locking ring 50 into its first position. The springs 86 are seated within appropriate cavities 88 in the housing 10, the cavities being in alignment with the recesses 84 in the piston 80.

During rearward movement of the piston, a peripheral flange 90 contacts the locking plate 50 and urges the plate to the rear, toward the ring 66, thereby disengaging the serrations 53 on the locking plate 50 from the serrations 38a and 40a of the locking collar 22, and thus permitting the locking collar to be displaced with respect to the spindle to unlock a tool holder therein. A threaded cylindrical structure 92 is threadably secured to the piston 80 and is slidably contained within a bore 94 in housing 10, for guiding the piston 80. Hence, it will be appreciated that the piston 80 does not rotate within the housing 10, but is only capable of axial movement therein.

An annular structure of brake material 96 (such as asbestos) is securely fastened to the piston 80 by an adhesive or other suitable means and embodies a bevelled, interior peripheral brake surface adapted to contact the bevelled surface 48 on the locking collar 22, to restrain rotation of the locking collar with respect to the housing, and thereby permit the spindle itself to be rotated for the tool changing procedure. It should be noted at this point that the flange 90 of the piston 80 will cause complete disengagement between the serrations 53 of the locking plate 50 and those of the locking collar 22 before the brake surface of annulus 96 contacts the bevelled surface 48 of the locking collar.

Figure 2:
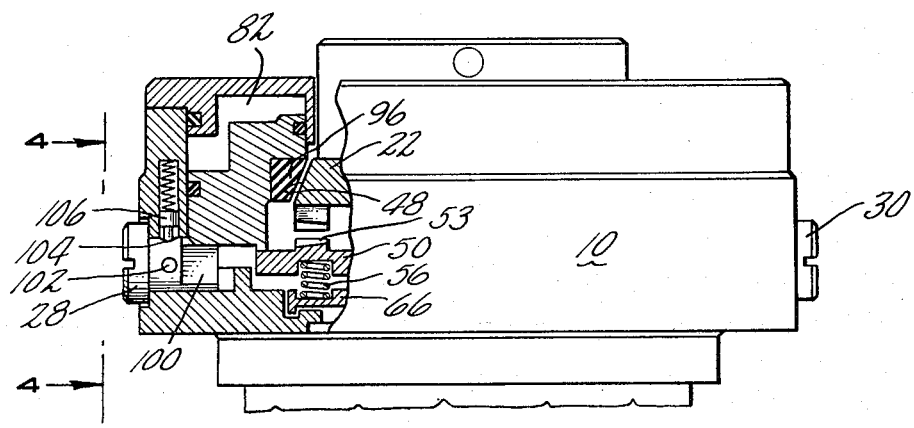
FIG. 2 is a side elevational view, partly in section, of the tool changer clamp of FIG. 1, taken along the line 2—2.
Figure 4:
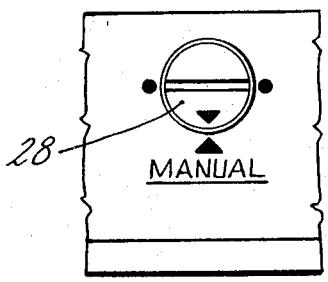
FIG. 4 is a fragmentary side elevational view of the tool changer clamp of FIG. 1, taken along the line 4—4 of FIG. 2, illustrating the mode of operation selection button.

It is the position of the selection buttons 28 and 30 which dictates the final position which the piston 80 will assume when an air signal is directed to the chamber 82. Thus, these buttons select the desired mode of operation for the tool changer clamp. Referring to FIGS. 2 and 4, the selection button 28 is depicted in a position which allows for manual tool changing. The selection button 28 is identical to the selection button 30 in construction and arrangement so that a balanced force is exerted on the piston when the piston has reached its limit of travel. Button 28 has a recessed end portion which defines a narrow, vertically extending structure 100 which, when the button is rotated 90° in either direction from its illustrated position of FIG. 2, permits the piston to assume a third position (final position) in the housing 10, wherein the brake surface firmly engages the bevelled surface of the locking collar. Hence, the two dots of FIG. 4 represent automatic operation of the tool changer clamp since the brake surface on the piston will restrain rotation of the locking collar when the button 28 is in either of these positions. With the selection button in the manual position, the piston cannot reach its third position because of structure 100, and thus will assume a second position (final position), wherein the annulus 96 is spaced from the surface 48. Hence, the piston 80 is movable to a second position or a third position under the impetus of an air pressure signal directed to the chamber 82.

The second position is illustrated in FIG. 2, wherein the upper portion of the structure 100 is in abuttment with the piston 80 and the locking plate 50 is axially displaced such that the respective serrations on the locking plate 50 and the locking collar 22 are separated from one another. In this second position it will be noted that the annulus 96 is spaced from the surface 48 of the locking collar, thereby permitting the locking collar to be turned to align the slots 24 and 18 for manual tool changing. In the configuration represented in FIG. 2, the locking collar 22 has been rotated approximately 90° from its FIG. 1 and 3 position in a counter-clockwise manner, as viewed from the front of the locking collar, and hence, a tool holder may be removed from the spindle and replaced by a different tool holder.

When the selection button 28 is rotated such that the index thereon is opposite one of the dot indices on FIG. 4, the piston 80 may assume its third position, in which the annulus of brake material 96 abuts the bevelled surface 48 of the locking collar, thereby restraining the locking collar from rotation. In this configuration, which is not shown in the drawings, the spindle may be rotated in a clockwise fashion, so that the slot 18 thereof is aligned with slot 24 of the locking collar 22.

The recesses 102 and 104, formed on an intermediate periphery of the selection button 28, receive a detentable, spring-loaded locking pin 106 to retain the selection button 28 in the selected position. The buttons 28 and 30 are preferably positioned in corresponding positions, but if one of the buttons is in a manual position and the other button is in an automatic position, the piston 80 can obviously only move to the second position under the influence of the air signal in chamber 82 since the structure 100, of the button which is in the manual position, will prevent movement of the piston 80 beyond the second position.

Turning now to FIG. 8, it should be apparent that the orientation of the locking collar 22 with respect to the spindle 14 is not critical with regard to locking the collar against rotational movement, as the respective serrations of the collar 22 and the locking plate 50 are generally shaped as right triangles. If the tips of the respective serrations on the collar and the locking plate contact one another when the air pressure signal in chamber 82 is removed, and the machine tool was subjected to severe vibrations, sufficient to cause rotation of the locking collar 40, it can be seen from FIG. 9 that the maximum angular distance which the collar 40 can rotate through is an arc defined by one serration. Thus, if the respective tips of the serrations 40a slide along the hypotenuses of the serrations 53, the locking collar will only be displaced an infinitesmal distance in the axial direction, which will not affect the accurate locking of the tool holder in the spindle. Further vibration will, of course, have no effect whatsoever on the relative positions of the locking collar and the locking plate.

OPERATION

A. Manual Operation

Assuming that the mode of operation selection buttons are each in the position illustrated in FIG. 4 and that a tool holder, such as that shown in FIG. 9, is positioned in the socket 16 of the spindle, to unlock the locking collar 22 from engaging contact with the locking plate 50, it is merely necessary to direct an air pressure signal by suitable means to the chamber 82. The piston 80 commences axial movement under the influence of the air pressure signal until it contacts the structures 100 on the selection buttons 28 and 30 and assumes the second piston position. Before this contact is made, the flange 90 of the piston 80 will have contacted the locking plate 50 and moved the serrations 53 thereupon out of engagement with the mating serrations on the locking collar. The piston 80 now occupies its second position, wherein the annulus of brake material 96 is spaced from the bevelled surface 48 of the locking collar 22 to permit untrammeled rotation of the locking collar to free the tool holder from the spindle. A suitable wrench, such as a spanner wrench, is then inserted into the hole 44 and the locking collar turned until the projection 38 contacts the projection 52 of the spindle 14. After this contact is achieved, the slots 24 and 26 of the locking collar are respectively aligned with the slots 18 and 20 of the spindle, thereby permitting manual removal of the tool holder since the lugs on the tool holder can now pass through these aligned slots. The tool holder is then removed and a new tool holder is inserted such that the lugs thereupon pass through the aligned slots. The locking collar is then rotated until the new tool holder is properly positioned within the socket 16. Finally, the air pressure in chamber 82 is reduced to thereby permit the piston to move towards the front of the housing 10 under the bias of springs 86 and 56. This movement of the piston 80 towards the front of the housing produces a corresponding movement of the locking plate under the bias of springs 56, this latter movement terminating when the serrations on the locking plate engage the serrations on the locking collar. The locking collar is now locked against counter-clockwise rotation relative to the spindle and the machine tool is ready to perform a new machining operation.

B. Automatic Operation

With the selection buttons positioned such that their respective indices oppose one of the dots shown in FIG. 4, the tool changer clamp is adapted for automatic operation. Directing an air signal to the chamber 82 increases the pressure therein, driving the piston towards the rear of the housing until the brake surface of annulus 96 contacts the bevelled surface 48 of the locking collar 22. Before this contact is achieved, of course, the serrations on the locking plate 50 and the locking collar will have been moved out of engagement by the flange 90 of the piston 80. The spindle is now rotated in the reverse, that is, the clockwise direction, to align the slots 18 and 20 with the slots of the locking collar 24 and 26, respectively. This relative rotation between the spindle and collar terminates when the projection 52 on the spindle contacts the projection 38 of the locking collar, at which point alignment occurs and the collar 22 assumes its unlocked position. However, the torque applied to the collar by the spindle is sufficient to overcome the frictional force applied to the collar's bevelled surface 48 by the annulus 96 after this contact so that the collar and spindle rotate in unison in the reverse direction. During this rotation, sliding contact is, of course, engendered between the surface 48 and the brake surface of the annulus 96. This sliding contact in the reverse direction continues until a suitable time delay mechanism (not shown) removes the air signal and thereby causes the piston to return to the first position. The automatic tool changing apparatus (not shown) then removes the tool holder from the socket of the spindle while the spindle continues to rotate in the reverse direction. The spindle continues to rotate in the reverse direction while a new tool holder is properly inserted in the socket 16. The spindle is then rotated in the forward direction and the air pressure signal is again directed to the chamber 82 to displace the piston to the third position where the brake surface engages surface 48. After the brake surface engages surface 48, the forwardly rotating spindle rotates relative to the collar 22 until the lugs of the new tool holder exert a torque on the collar shoulder 46 sufficient to cause the collar to rotate with the spindle against the restraining force applied to the collar by the brake surface. The new tool holder is now locked in the spindle and the collar is in its locked position. The spindle, collar, and tool holder then rotate in unison in the forward direction. The air pressure signal is subsequently relieved from chamber 82 to permit the piston to move towards the front of the housing and the locking plate to move into engagement with the locking collar. The machine tool is now ready to perform a new machining operation.

It will be understood that the term "tool holder," as used herein, is to be construed as covering not only holders, but also tools which are directly secured to the spindle. It will also be understood that the invention is not limited to the construction illustrated, since the axial locking arrangement illustrated could be replaced by a radial locking arrangement, and the serrations replaced by other suitable engaging means. Further, it will be appreciated that the illustrated tool changer clamp according to the invention could be modified to receive a tool holder without lugs by replacing the slot arrangement with a suitable alternate retaining means.

Thus, as will be apparent to persons skilled in the art, various modifications and adaptations of the illustrative structure above-described will become readily apparent without departure of the spirit and scope of the invention, the scope of which is defined in the appended claims.

I claim:

1. A tool holder clamp comprising:
  a housing;
  a spindle, having a socket for receiving a tool holder, mounted for rotation within the housing;
  a locking collar carried by the spindle and positionable in an unlocked position in which the tool holder may be received in the socket and a locked position in which the tool holder is secured in the socket;
  means to secure the collar to the spindle for rotation relative thereto in a first direction from the unlocked position to the locked position and in a second direction from the locked position to the unlocked position;
  means to engage the collar to lock the collar against rotation relative to the spindle in the second direction when the collar is in the locked position; and
  means mounted in the housing to contact and disengage the engaging means to unlock the collar to permit relative rotation between the collar and the spindle for replacing the tool holder with a new tool holder.

2. A tool holder clamp, as defined in claim 1, further including:
  means to restrain the collar against rotation relative to the housing after the engaging means is disengaged for permitting rotation of the spindle relative to the housing to position the collar in the unlocked position.

3. A tool holder clamp, as defined in claim 2, further including:
  means to contact the disengaging means after the engaging means is disengaged to prevent the restraining means from restraining the collar against rotation relative to the housing, the contacting means permitting rotation of the collar relative to the housing.

4. A tool holder clamp comprising:
  a housing;
  a spindle, having a socket for receiving a tool holder, mounted for rotation within the housing;
  a locking collar in threaded engagement with the spindle for rotation therewith, the collar being rotatable in a first direction relative to the spindle from an unlocked position, in which the tool holder may be received in the socket, to a locked position in which the tool holder is secured in the socket, the collar also being rotatable in a second direction relative to the spindle from the locked position to the unlocked position in which the tool holder may be replaced with a new tool holder;

means to terminate rotation of the collar in the second direction relative to the spindle when the collar assumes the unlocked position;

a locking device mounted on the spindle for rotation therewith such that it is movable into and out of locking engagement with the collar;

means on the locking device to engage and lock the collar against rotation relative to the spindle in the second direction when the collar is in the locked position; and means to contact and move the locking device out of locking engagement with the collar.

5. A tool holder clamp, as defined in claim 4, wherein the locking device comprises;

a locking plate coaxially mounted on the spindle for sliding axial movement thereover; and wherein the engaging and locking means comprises:

a plurality of serrations integral with the locking plate; and wherein the collar comprises:

a plurality of mating serrations, the serrations of the locking plate adapted to engage the mating serrations of the collar.

6. A tool holder clamp, as defined in claim 5, wherein the contacting and moving means comprises:

a piston slideably mounted within the housing for axial movement therein between first, second and third positions;

means on the piston to contact and displace the locking plate such that the respective serrations on the collar and the locking plate are moved out of locking engagement.

7. A tool holder clamp, as defined in claim 6, further including:

a brake surface on the piston for contacting the locking collar when the piston is in the third position; and selector means to stop the piston in the second position, the brake surface being spaced from the collar in the second position to thereby permit rotation of the collar with respect to the housing and the spindle for manual tool changing.

8. A tool holder clamp comprising:

a housing;

a spindle, having a socket for receiving a tool holder, mounted for rotation within the housing;

a plurality of threads on the exterior of the spindle;

a locking collar, having interior threads, mounted on the spindle in coaxial relationship therewith such that the threads of the collar engage the threads of the spindle, the locking collar being adapted to retain the tool holder in the socket of the spindle;

a plurality of circumferentially arranged serrations on the collar;

a locking plate coaxially mounted on the spindle for axial sliding movement thereover and rotational movement therewith;

a plurality of circumferentially arranged serrations on the locking plate, the locking plate serrations adapted to engage the collar serrations for locking the collar against rotation relative to the spindle;

means to urge the locking plate into locking engagement with the collar;

a piston mounted within the housing, in coaxial relationship to the spindle, for axial sliding movement therein such that it is adapted to contact the locking plate and displace the locking plate against the urging of the urging means and thereby disengage the respective serrations of the collar and the locking plate.

9. A tool holder clamp, as defined in claim 8, wherein the piston is axially movable between first, second, and third positions, the respective serrations being disengaged in the second and third positions, and wherein there is further provided:

a structure made of brake material secured to the piston for contacting a peripheral surface of the collar when the piston is in the third position for restraining rotation of the collar with respect to the housing so that the tool holder may be changed by rotating the spindle in a reverse direction, the structure being spaced from the peripheral surface of the collar when the piston is in the second position; and selector means to contact the piston to prevent movement thereof beyond the second position so that the collar may be rotated with respect to the housing and the spindle for changing the tool holder.

10. A tool holder clamp, as defined in claim 8, wherein the spindle comprises:

a radial projection, the locking plate having a slot which receives the projection such that locking plate straddles the projection, the projection preventing rotational movement of the locking plate with respect to the spindle and serving as a guide for the axial movement of the locking plate over the spindle; and wherein the spindle comprises a slot and the collar comprises a slot adapted to be aligned with the spindle slot to permit removal and replacement of the tool holder in the socket and to be angularly spaced from the spindle slot to retain the tool holder in the socket; and wherein the collar includes:

a pair of diametrically opposed projections, the collar serrations being located on the projections, the collar being positioned on the spindle such that when contact is established between one of collar projections and the projection on the spindle the respective slots are in alignment.

11. A tool holder clamp, as defined in claim 8, wherein the respective serrations of the locking plate and the collar are shaped as right triangles.

* * * * *